United States Patent [19]
McDermott

[11] Patent Number: 6,030,099
[45] Date of Patent: Feb. 29, 2000

[54] SELECTED DIRECTION LIGHTING DEVICE

[76] Inventor: Kevin McDermott, 196 Phillips Dr., Hampstead, Md. 21074

[21] Appl. No.: 09/097,798

[22] Filed: Jun. 16, 1998

[51] Int. Cl.[7] .................................................... F21V 23/04
[52] U.S. Cl. .......................... 362/276; 362/251; 362/802; 362/477
[58] Field of Search .................................... 362/800, 802, 362/276, 249, 251, 244, 245, 477

[56] References Cited

U.S. PATENT DOCUMENTS

| | | | |
|---|---|---|---|
| 4,654,629 | 3/1987 | Bezos et al. | 362/800 X |
| 5,003,443 | 3/1991 | Sabala | 362/249 X |
| 5,101,326 | 3/1992 | Roney | 362/800 X |
| 5,325,271 | 6/1994 | Hutchisson | 362/32 |
| 5,585,783 | 12/1996 | Hall | 362/800 X |
| 5,750,974 | 5/1998 | Sasaki et al. | 362/800 X |
| 5,893,633 | 4/1999 | Uchio et al. | 362/249 X |
| 5,921,660 | 7/1999 | Yu | 362/249 |

*Primary Examiner*—Laura K. Tso
*Attorney, Agent, or Firm*—Leonard Bloom

[57] ABSTRACT

A lighting device is constructed with LED light sources and a power control to project light along a selected direction throughout an angular range of tilt of the lighting device about a vertical. The power control includes a tilt switch or tilt sensor which is responsive to the angular displacement of the lighting device about a vertical plane. A plurality of beams are arranged to project a plurality of oblique light beams. If during its deployment the lighting device is angularly displaced about the vertical, the power control selectively energizes the beam which projects a light beam including the selected direction when the lighting device is angularly displaced. The divergence of the selected light beam from the selected direction when the light is vertical counterbalances the effect resulting from the angular displacement of the lighting device about the vertical permitting the light beam emerging from the lighting device to emerge directed along the selected direction throughout a range of angular tilt of the lighting device.

18 Claims, 8 Drawing Sheets

SELECTED DIRECTION LIGHTING DEVICE

BACKGROUND OF THE INVENTION

There are many requirements for lighting devices which are needed to project light in a substantially horizontal direction so that a distant observer can locate the light. A typical use would be a navigation light on a ship. These red or green lights are required on ships so that other ships will know of their location and avoid potential accidents. Navigation lights are normally constructed to provide a light beam of a specification intensity and a specification vertical beamwidth above and below the horizontal plane. Unfortunately, ships and other craft such as sailboats roll in the water beyond the vertical specification beamwidth of the lights such that the navigation lights misdirect their projected beam either upward or downward. This misdirection of light can create a substantial hazard as other ships are denied the lighting signal that can alert them to a potential accident.

For uses other than as navigation lights such as buoy lights the lighting device may be flashing. A flashing requirement intensifies the problem of misdirected light because for the light to be visible to a horizontal observer during a rolling motion the light must flash at substantially the exact time that the light is projecting light in the horizontal direction. Normally this requires the lighting device to be disposed substantially in the vertical position. If the light flashes when the projected beam is misdirected above or below the horizontal, virtually all of the light energy will miss the observer. If the light continues to flash at the time its beam is directed away from the horizontal, it can remain unseen for an unacceptable length of time. A misdirected steady light also has its visibility decreased by a rolling movement of the lighting device however, as the lighting device oscillates about the vertical it will at least, for a short period of time, direct some of its light in the direction of a horizontal observer.

SUMMARY OF THE PRESENT INVENTION

It is an object of the current invention to provide a lighting device which, throughout angular movement about a vertical reference plane, maximizes the percentage of light it emits that is concentrated within a vertical angular beamspread about a selected direction.

It is a further objective of the current invention to provide a lighting device that, at a first angular displacement about a vertical, projects a first beam of light including within that beam light parallel to a selected direction and which at a second angular displacement about the vertical, projects a second beam of light that includes within that beam light parallel to the selected direction.

The present invention will find application whenever a lighting device is required to project a beam of light in a selected direction relative to a vertical even though the lighting device cannot be disposed at a fixed angular position relative to the vertical. Uses for the present invention include a navigation light on a ship where the lighting device rolls relative to the vertical but its projected light beam is required to be directed along the horizontal.

The present invention can also be employed as a buoy light which oscillates in the water but is required to project a substantially horizontal beam.

Another use can be found as a headlight for a vehicle whereby the projected beam from the lighting device should remain directed in a selected direction angularly below the horizontal even as the vehicle and light mounted thereon rotate relative to the vertical due to bumps or rocks on the road.

In accordance with the teaching of the present invention, there is disclosed an electrical lighting device having a plurality of light beam means connectable to a source of electrical power having a voltage and a plurality of light beam means. Each of said light beam means has a light source for projecting a respective light beam upon application of the voltage to said respective light source. A circuit assembly includes said plurality of light beam means and a power control means. Said circuit assembly is at least partially disposed on a support such that said light beams are diverging from one another. Said power control means selectively applies the voltage to at least one of said light beam means in response to an angular divergence between said light beam and said horizontal plane.

In another aspect, there is disclosed an electrical lighting device having a plurality of component lighting devices connectable to a source of electrical power having a voltage. Each of said component lighting devices projects a respective light beam upon application of the voltage to said respective component lighting devices. A circuit assembly said plurality of component lighting devices and a power control. Said circuit assembly is at least partially disposed on a support such that said light beams are diverging from one another. Said power control has a respective tilt switch connected between each said component lighting device and said source of electrical power. Said power control is responsive to the vertical angular disposition of said support relative to a vertical plane. Said power control switches each of said tilt switches at a preselected vertical angular disposition of said support such that power is provided to at least one of the component lighting devices depending upon the vertical angular disposition of said support.

A method is disclosed of providing a beam of light in a horizontal plane irrespective of the vertical angular disposition of a support upon which an electrical lighting device generating the beam of light is mounted.

These and other objects of the present invention will become apparent from a reading of the following specification, taken in conjunction with the enclosed drawings.

DETAILED DESCRIPTION OF THE PREFERRED EMBODIMENTS

Figure 1:
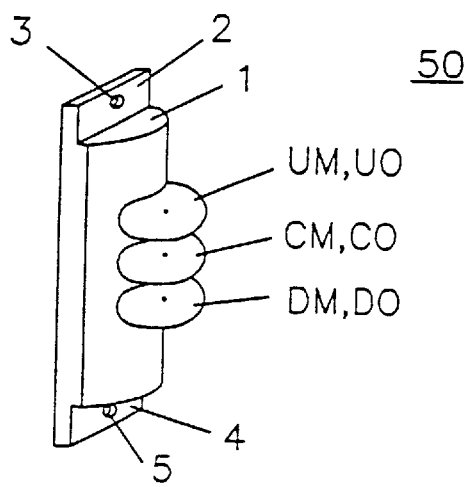
FIG. 1 is a perspective view of lighting device 50.

The present invention emits a light beam which directs light in a selected direction relative to a vertical line or vertical plane. It further maintains a projected light beam in the selected direction even when the lighting device is angularly displaced or rotated about the vertical plane. It achieves this objective by providing a plurality beam means to project a plurality of oblique light beams. If the selected direction is along a horizontal plane and the lighting device is in its vertical position each of the projected light beams is directed either along the horizontal plane, diverging upward about the horizontal plane or diverging downward about the horizontal plane. Each of the potentially projected light beams includes a vertical beamwidth to cooperate with the beamwidths of the other projected light beams to form a composite light beam having a vertical beamspread approximately equal to the range of angular movement the lighting device is expected to experience. The lighting device should also provide the minimum intensity required for the intended use. One method of achieving this objective is for the composite beam to provide the minimum intensity throughout its vertical beamspread. A power control means which selectively illuminates one or more of the beam means at the time that at least a portion of the projected light from that selected beam means is projected parallel to the horizontal, is also included. The power control means can illuminate the selected beam means when the lighting device attains an established angular orientation relative to a vertical line or plane. Alternatively, it can illuminate the selected beam means when the axis of that beam means attains an established angular orientation relative to the selected direction. Alternatively, it can illuminate a selected beam means when some other reference such as the axis of any beam attains an established angular orientation relative to the selected direction.

For the current application, the components necessary to project one of the plurality of the beams of light from the lighting device are identified as a beam means. A beam means is simply a lighting device which projects a concentrated light beam. The present invention requires a plurality of component lighting devices or beam means. The individual component lighting device employed in the current invention can be assembled from readily available components. They are also available as complete assemblies such as sealed beam bulbs. A beam means can be formed from a large variety of combinations of a light source and an optic. Since most light sources including LED elements emit light which comprises a widely diverging spatial radiation pattern the emitted light is normally concentrated by an optical system such as a reflector, encapsulating refractor or separate lens. The reflector is commercially known as a successful light collection device and in its most common form will collect the light into a concentrated beam pattern. The encapsulating refractor also commercially known is usually a transparent epoxy cast around the LED element into a curved aspheric shape to form a LED lamp. The curved aspheric shape refracts the light from the LED element as it passes through the refractor to concentrate the light into a concentrated round beam pattern. This design is found in the commercially available T 1¾ LED lamp. Finally, the separate light condensing plano convex lens is currently commercially employed to function with a LED lamp to collect the light into a concentrated projected light beam. The beam means can also include an electroluminescent source and a curved condensing lens. The current invention requires at least two beam means. For some uses to be hereinafter described, a larger number of beam means will represent an improved design.

Also the present description employs the term projected light beam. Projected light beams are defined in a number of ways. A common system which is employed in this disclosure defines a central axis which indicates the direction of maximum intensity. Directions within a vertical reference plane drawn coincident with the central axis representing directions indicating intensities of a percentage of the maximum intensity (usually fifty but any percentage can be employed) define the vertical boundaries of the vertical beamspread. Directions within a horizontal plane drawn coincident with the central axis representing directions indicating intensities of a percentage of the maximum intensity (usually fifty but any percentage can be employed) define the horizontal boundaries of the horizontal beamspread. The included angle between the vertical beamspread boundaries is the vertical angular beamspread. The included angle between the horizontal beamspread boundaries is the horizontal angular beamspread.

As part of this disclosure when the angular divergence between two light beams is discussed, this can be considered to be the angular divergence between the central axes of the respective light beams. Also, normally the central axis of a projected light beam is a bisector of the vertical angular beamspread. It is also usually a bisector of the horizontal angular beamspread. The location of the central axis of the projected beams is helpful in describing some embodiments of the current invention but the invention can be constructed using almost any projected light beams regardless of their intensity profiles.

FIGS. 1, 2, 3, and 4 are perspective, front, plan and side views respectively of lighting device 50 which represents a preferred embodiment of the current invention used as a navigation light on a ship.

Figure 3:
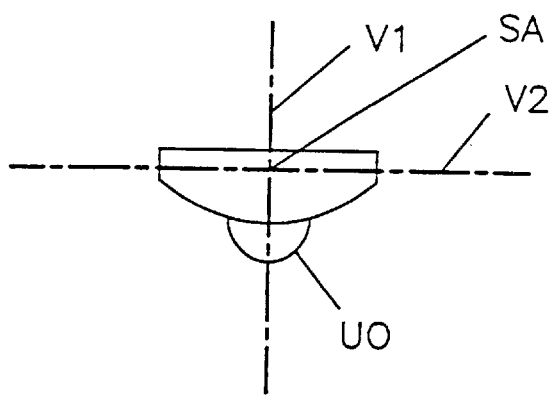
FIG. 3 is a plan view of lighting device 50.

FIG. 3 is a plan view of lighting device 50 with vertical reference plane V1 and perpendicular vertical reference tilt plane V2 both coincident with switch axis SA to be later described.

Figure 2:
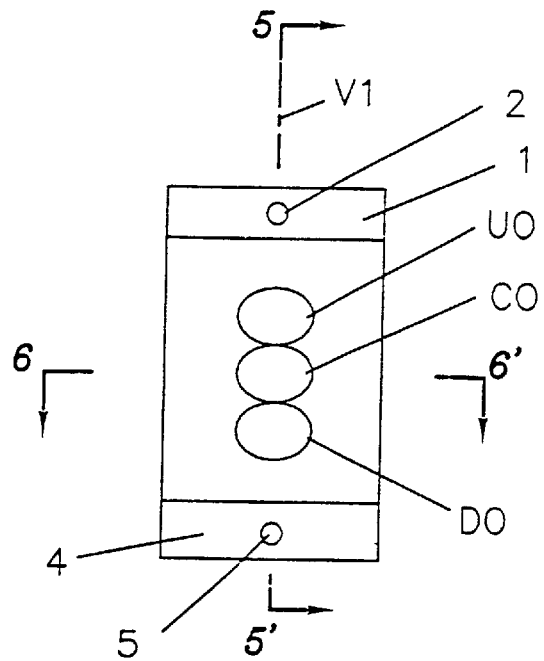
FIG. 2 is a front view of lighting device 50.
Figure 5:
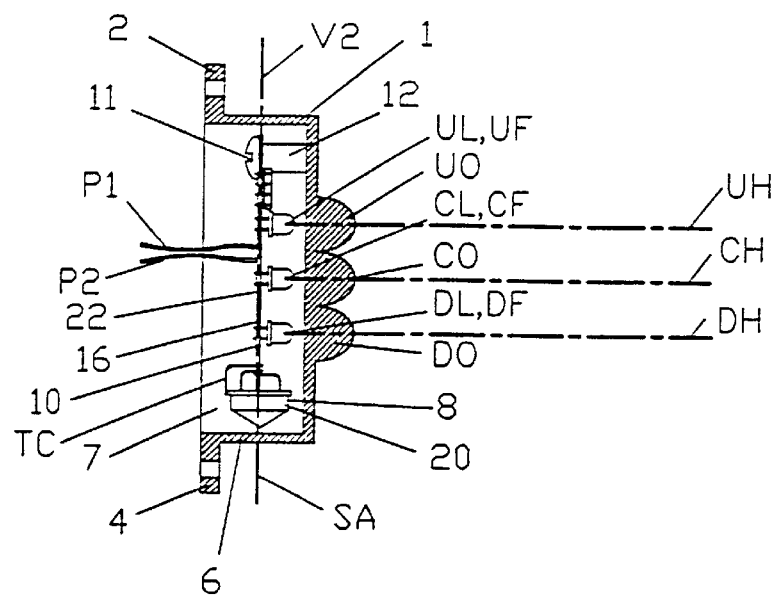
FIG. 5 is a partial cross-sectional view of lighting device 50 taken across line 5–5' of FIG. 2.
Figure 6:
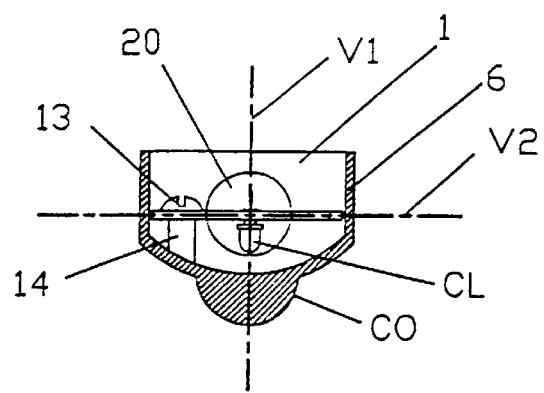
FIG. 6 is a partial cross-sectional view of lighting device 50 taken across line 6–6' of FIG. 2.

FIG. 5 is a partial cross-sectional view of lighting device 50 taken across line 5–5' of FIG. 2. FIG. 6 is a partial cross-sectional view of lighting device 50 taken across line 6–6' of FIG. 2. Lighting device 50 comprises housing 1, usually injection molded, of a transparent plastic such as polycarbonate. Housing 1, which is the only component shown cross-sectioned, includes top flange 2 with top mount hole 3 and bottom flange 4 with bottom mount hole 5. Top flange 2 and bottom flange 4 permit lighting device 50 to be bolted to a vertical surface such as a bulkhead on a ship thereby establishing a vertical position. Housing 1 further is molded into a shape which includes an upward optic UO, central optic CO, downward optic DO and surrounding wall 6 forming cavity 7. Cavity 7 accepts circuit assembly 10 which is fastened to housing 1 by threading upper screw 11 into upper housing rib 12 and lower screw 13 into lower housing rib 14.

Figure 4:
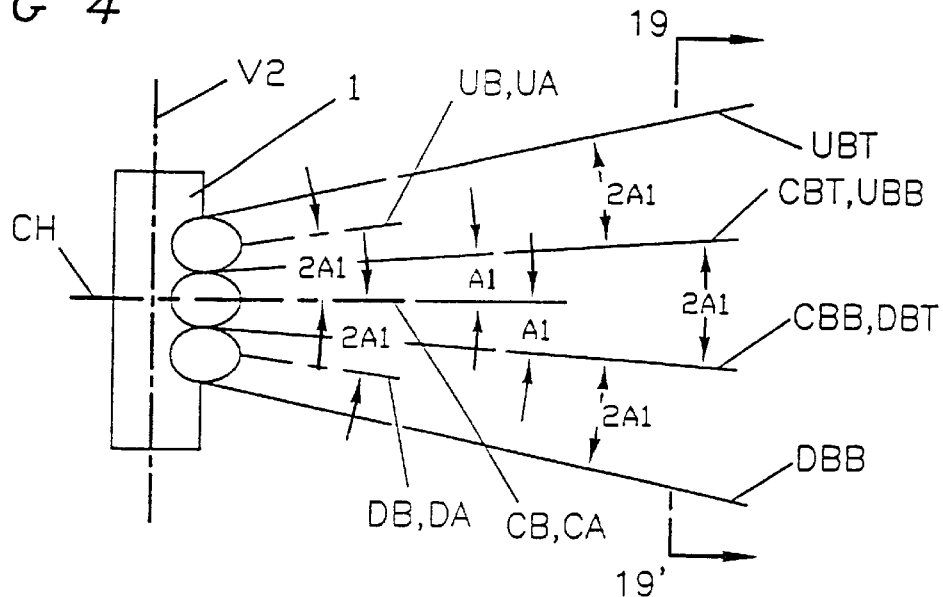
FIG. 4 is a side view of lighting device 50 with all three of the beam means energized.
Figure 7:
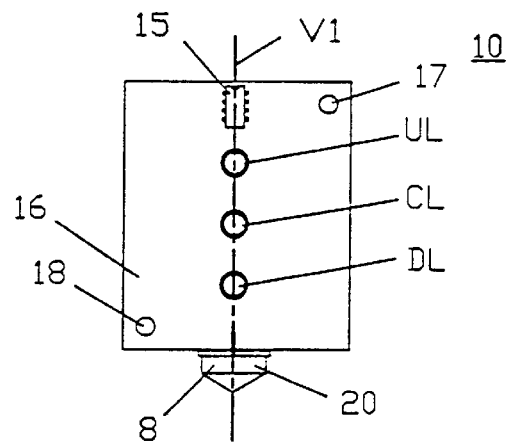
FIG. 7 is a front view of circuit assembly 10 from FIG. 5 of lighting device 50.

Referring to FIGS. 4 thru 6, previously described, and to FIG. 7, which is a front view of circuit assembly 10 from FIG. 5, it can be seen that circuit assembly 10 comprises upward LED lamp UL, central LED lamp CL, downward LED lamp DL, mercury tilt switch 20 and NOR gate 15 all mounted on circuit board 16. Positive power line P1 and negative power line P2 bring a power supply voltage VCC to circuit assembly 10. In place of an external source of power connected to power lines P1 and P2, lighting device 50 can alternatively be energized by a battery potentially stored within cavity 7 of housing 1. Circuit board 16 has upper hole 17 and lower hole 18 provided to accept upper screw 11 and lower screw 13 respectively to facilitate fastening circuit assembly 10 to housing 1. Either circuit board 16 or housing 1 can be considered as a full or partial support means for power control means 8 and circuit assembly 10.

Figure 8:
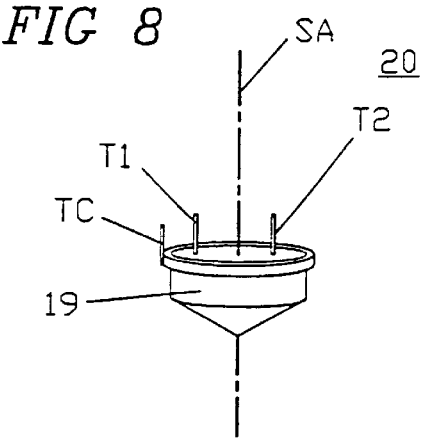
FIG. 8 is a perspective view of tilt switch 20 from circuit assembly 10.
Figure 9:
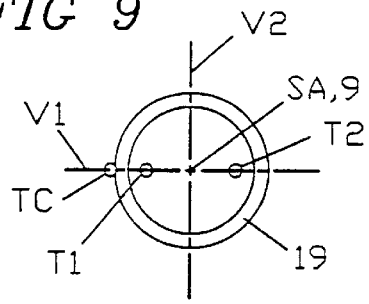
FIG. 9 is a plan view of tilt switch 20.

FIGS. 8 and 9 are perspective and plan views respectively of a standard commercially available two direction mercury tilt switch 20. Tilt switch 20 comprises a metal body 19, common electrical terminal TC, downward terminal T1 and upward terminal T2. Switch axis SA passes through geometric center 9 of metal body 19.

Now looking at FIGS. 1 thru 7, lighting device 50 comprises three beam means. Upward beam means UM includes upward LED lamp UL positioned approximately at upward focal point UF of upward optic UO such that when energized they cooperate to emit upward beam UB. Upward horizontal reference plane UH is a horizontal reference plane coincident with upward focal point UF. This reference plane as well as all other horizontal reference planes maintain their horizontal disposition regardless of the angular tilt of lighting device 50. Upward beam UB comprises upward beam axis UA which represents the direction of maximum intensity within upward beam UB, upward boundary top UBT and upward boundary bottom UBB represent directions indicating intensities at fifty percent of the maximum intensity. Central beam means CM includes central LED lamp CL positioned near central focal point CF of central optic CO positioned such that, when energized, they cooperate to emit central beam CB. Central horizontal reference plane CH is a horizontal reference plane coincident with central focal point CF. Central beam CB comprises central beam axis CA which is a direction of maximum intensity within central beam CB. Downward beam means DM includes downward LED lamp DL positioned near downward focal point DF of downward optic DO such that, when energized, they cooperate to emit downward beam DB. Downward horizontal reference plane DH is a horizontal reference plane coincident with downward focal point DF. Downward beam DM comprises downward axis DA which is a direction of maximum intensity within downward beam DB. Lighting device 50 therefore comprises three beam means which are substantially identical with identical components and beam profiles. Each of the three beam means however projects its light beam in a different direction. Therefore, the three beams diverge from one another or equivalently their beam axes diverge. Also the boundary of one beam ends where the boundary of the next beam begins such that the beams means if simultaneously illuminated, would form a substantially continuous composite light beam. The composite light beam would for most embodiments of the current invention, comprise a vertical beamspread which was larger than the vertical beamspread of any of the component beams. For some embodiments, the vertical beamspread of the composite beam could be large enough whereby it was almost equal to the sum of the vertical beam-spreads of the component light beams. For lighting device 50, the upper boundary bottom UBB of upper beam UB is coincident with the central boundary top CBT of central beam CB, the central boundary bottom CBB of central beam CB is coincident with the downward boundary top DBT of downward beam DB. Upward beam axis UA forms angle 2A1 with central beam axis CA. Central beam axis CA forms angle 2A1 with downward beam axis DA. The similar beam means, relative angular disposition among the beams, fifty percent intensity differential between each beam axis and its related beam boundaries, are all parameters which are shown in lighting device 50 describing the present embodiment. However, alternative lighting devices can easily be constructed employing the concepts described in this disclosure and achieving the objectives of the invention even with dissimilar beam means, different relative angular dispositions of the beam axes and alternate intensity differentials between the maximum beam intensity and boundary intensities.

Figure 10:
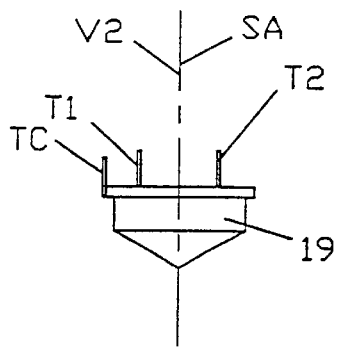
FIG. 10 is a side view of tilt switch 20 disposed in the vertical position.
Figure 11:
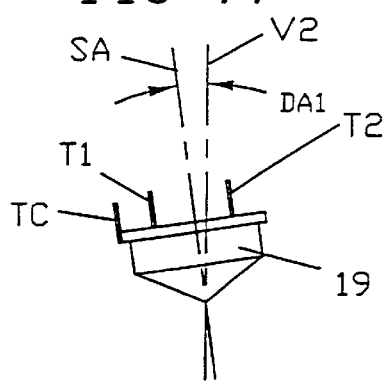
FIG. 11 is a side view of tilt switch 20 rotated counter-clockwise about the vertical tilt plane.
Figure 12:
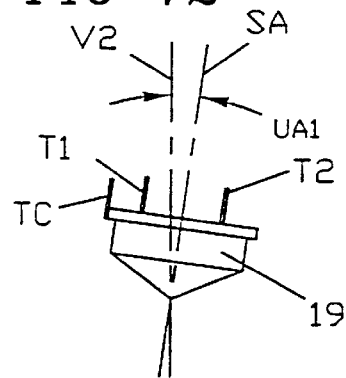
FIG. 12 is a side view of tilt switch 20 rotated clockwise about the vertical tilt plane.

FIG. 10 is a side view of tilt switch 20 from FIG. 5 with switch axis SA coincident with tilt plane V2. In this position tilt switch 20 is in the vertical position and common terminal TC is not connected to downward terminal T1 or to upward terminal T2. Tilt switch 20 actually comprises two internal switches, each of which will selectively switch or connect its respective terminal to common terminal TC when tilt switch 20 is rotated relative to tilt plane V2 such that switch axis SA attains at least a specified angle of divergence and a specified rotational direction relative to tilt plane V2. In FIG. 11 tilt switch 20 is rotated counterclockwise about tilt plane V2 so that switch axis SA is at counterclockwise angle DA1 relative to tilt plane V2. In this position in which tilt switch 20 has a counterclockwise tilt of at least counterclockwise angle DA1, common terminal TC is connected to downward terminal T1 and common terminal TC is not connected to upward terminal T2. In FIG. 12 tilt switch 20 is rotated clockwise about tilt plane V2 so that switch axis SA is at clockwise angle UA1 relative to tilt plane V2. In this position in which tilt switch 20 has a clockwise tilt of at least clockwise angle UA1 relative to tilt plane V2 common terminal TC is connected to upward terminal T2 and common terminal TC is not connected to downward terminal T1. In the present embodiment, counterclockwise angle DA1 is equal to clockwise angle UA1 however, lighting device 50 can also function with unequal values of counterclockwise angle DA1 and clockwise angle UA1 as long as the other components of lighting device 50 are correspondingly designed to achieve the disclosed objectives of the current invention. A designer with the current disclosure in hand can easily configure an unbalanced design.

Figure 13:
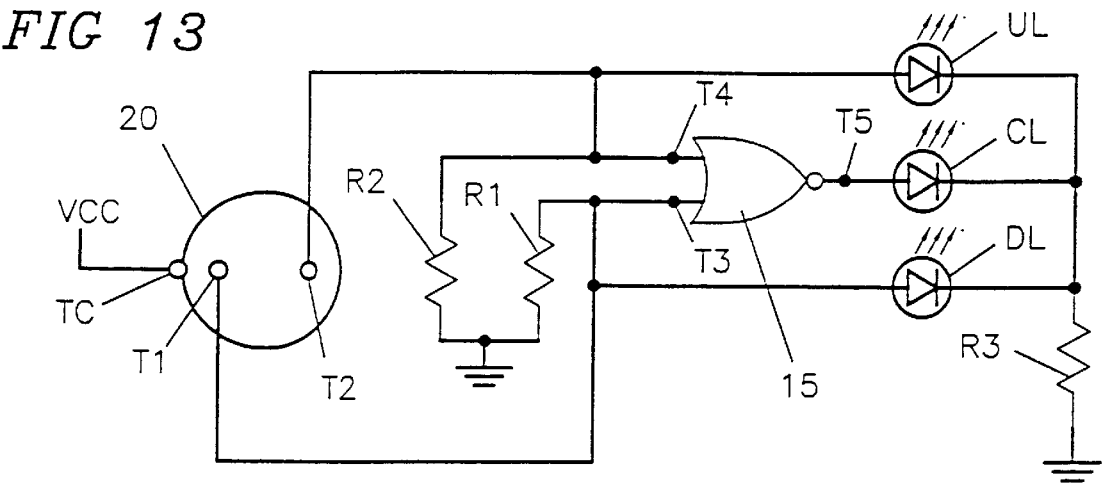
FIG. 13 is an electrical schematic of circuit assembly 10.

FIG. 13 is a schematic of the circuit comprising the components of circuit assembly 10. For the present embodiment the primary components of circuit assembly 10 include:

1 each tilt switch part number CM415 mfg. by Comus International
1 each NOR gate
3 each LED lamps commercial type T1¾
1 each resistor R1
1 each resistor R2
1 each resistor R3

These are readily available components which function acceptably. There are numerous alternate components that can be successfully substituted for those identified. Circuit board 16 comprises circuit tracks 22 formed by standard commercial procedures for electrically connecting the components according to the schematic of FIG. 13. In this embodiment supply voltage VCC is 6 volts DC however the present invention can be made to function with almost any supply voltage by changing one or more components using classical engineering design procedures.

Figure 14:
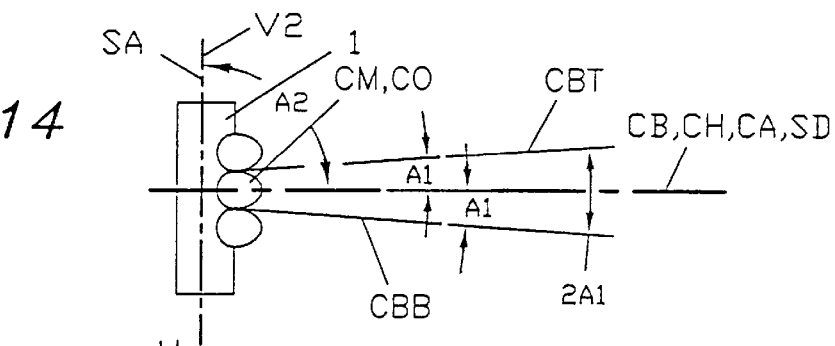
FIG. 14 is a side view of lighting device 50 disposed in the vertical position with only the central beam means energized.

FIG. 14 is a side view of lighting device 50 in the vertical position it would assume if the ship were in perfectly calm water. In FIG. 14, only central beam means CM is energized, emitting central beam CB having central axis CA. Central axis CA is coincident with central horizontal reference plane CH as well as selected direction SD. Selected direction SD represents the direction along which light is required to be projected from lighting device 50. The selected direction SD does not change with an angular tilt of lighting device 50. Light projected parallel to the selected direction SD will be considered directed in the selected direction SD. Selected direction SD forms angle A2 with tilt plane V2. For this embodiment, angle A2 is 90 degrees making the selected direction parallel to the central horizontal reference plane CH, however, the selected direction can have a different value for other embodiments of the current invention.

Figure 15:
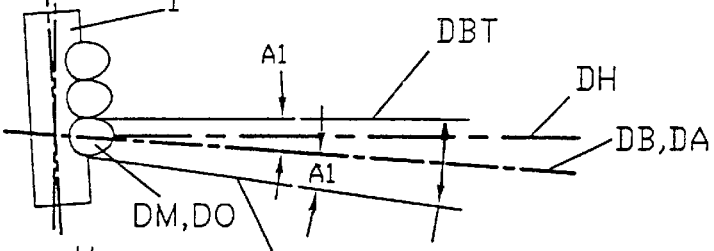
FIG. 15 is a side view of lighting device 50 disposed rotated counterclockwise about the vertical tilt plane with only the downward beam means energized.

FIG. 15 is a side view of lighting device 50 as it would appear if it were rotated counterclockwise to angle DA1 about tilt plane V2 due to a rolling of the ship in a first direction.

Figure 16:
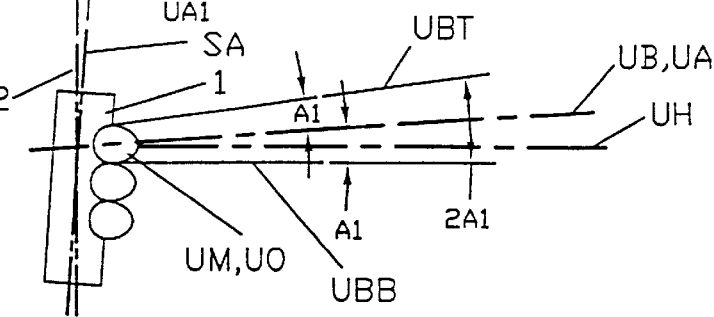
FIG. 16 is a side view of lighting device 50 disposed rotated clockwise about the vertical tilt plane with only the upward beam means energized.

FIG. 16 is a side view of lighting device 50 as it would appear if it were rotated clockwise to angle UA1 about tilt plane V2 due to a rolling of the ship in a second and opposite direction.

Referring to all of FIGS. 1 thru 16 but especially FIGS. 5, 10, 13 and 14, it can be seen that when lighting device 50 is in the vertical position as shown in FIG. 14 switch axis SA of tilt switch 20 is coincident with vertical plane V1 as well as tilt plane V2 as shown in FIG. 10. For this position of tilt switch 20, supply voltage VCC is not applied to downward terminal T1 or upward terminal T2. In this case, resistor R1 brings NOR input terminal T3 to ground potential and resistor R2 brings NOR input terminal T4 to ground potential. Therefore, both NOR input terminal T3 and NOR input terminal T4 are at ground potential making NOR output terminal T5 high, thus energizing central LED lamp CL. Resistor R3 is disposed between each LED lamp and ground to assure that each LED lamp draws the appropriate current.

Neither upper LED lamp UL or downward LED lamp DL will be energized since neither downward terminal T1 or upward terminal T2 are connected to supply voltage VCC. Central LED lamp CL of central beam means CM is thus illuminated directing light into central optic CO. Central optic CO is typically a classical aspheric piano convex condensing lens with central LED lamp CL positioned substantially at its focal point CF. Thus light emerging from central optic CO will be formed into a central beam CB concentrated about central horizontal plane CH and about central beam axis CA.

Central beam CB comprises central beam axis CA representing the direction of maximum beam intensity. Central beam CB further comprises central boundary top CBT and central boundary bottom CBB each representing directions equal to fifty percent of the maximum beam intensity. This embodiment would comply with a specification that required a minimum intensity which was fifty percent of the beam intensity of central beam CB. Central boundary top CBT and central boundary bottom CBB define the vertical beamspread of central beam CB which for the present embodiment is 2A1 degrees. Central beam axis CA bisects the vertical beamspread forming angle A1 between central beam axis CA and central boundary top CBT and angle A1 between central beam axis CA and central boundary bottom CBB. It is to be noted that in FIG. 14 central boundary top CBT comprises a positive slope (i.e. it increases in value with distance along central horizontal plane CH and away from central optic CO). Also central boundary bottom CBB has a negative slope (i.e. it decreases in value with distance along central horizontal plane CH and away from central optic CO).

Finally, central horizontal plane CH has a zero slope. If as in the current embodiment the selected direction SD is along the central horizontal plane then lighting device 50 must project light in the horizontal direction or equivalently parallel to any horizontal plane. For this objective power control means 8 should selectively energize the beam means which, for an existing angular disposition of lighting device 50 relative to tilt plane V2, will direct light along a horizontal direction. This is achieved for the FIG. 14 disposition of lighting device 50 if power control means 8 energizes central beam means CM because the zero slope of central horizontal plane CH has a value between the positive slope of central boundary top CBT and the negative slope of central boundary bottom CBB. In lighting device 50, counterclockwise angle DA1, clockwise angle UA1 and angle A1 are all equal. The current invention can still be constructed if they are unequal however, the equality of angles simplifies the design.

Thus the current embodiment discloses a design which energizes the central beam means CM whenever the disposition of lighting device 50 is such that either the central boundary top CBT, or the central boundary bottom CBB, has a zero slope (i.e. it is horizontal). The central beam means CM continues to be energized as lighting device 50 rotates until the remaining boundary achieves a zero slope (i.e. it becomes horizontal). This represents one of many methods of constructing the current invention. The power control means 8 could, in fact, illuminate a selected beam means other that at the disposition of lighting device 50 where a boundary of the beam aligned with the selected direction. Alternatively, a selected beam means could be illuminated only after the selected direction was within the boundaries of the light beam. The current embodiment could also simultaneously illuminate more than one of the beam means. For other embodiments, especially those experiencing dynamic motion, the design could possibly be improved if the power control means energized the selected beam means when selected direction was exterior to the beam. Actually, a number of factors can affect the relationship between the disposition of lighting device 50 and the appropriate time to energize a selected beam means by power control means 8. These factors include, but are not limited to: response time of the beam means, response time of the power control means, tolerances of components, desirability of overlapping beams, etc. In the current embodiment, the central beam means CM will remain lighted only as long as the disposition of lighting device 50 is such that either a clockwise rotation does not equal or exceed angle UA1 or a counterclockwise rotation does not equal or exceed angle DA1. This configuration is easy to describe, however it can be modified for other embodiments of the current invention if the aforementioned design factors so indicate.

The functioning of the current invention can be described from another perspective. The current invention would be employed if power control means 8 extinguishes at least one of the beam means when that beam means is positioned such that its projected light beam would not include the selected direction within its boundaries. The power control means 8 can also be identified as a power control or a power control device.

Now referring especially to FIGS. 5, 11, 13, and 15, it can be seen that when lighting device is 50 rotated counterclockwise to angle DA1 about tilt plane V2 as shown in FIG. 15, switch axis SA of tilt switch 20 is disposed as shown in FIG. 11. For this position of tilt switch 20 common, terminal TC is connected to downward terminal T1 thus applying supply voltage VCC to NOR input terminal T3. Common terminal TC is not connected to upward terminal T2. Therefore, with resistor R2, NOR input terminal T4 is brought to ground potential.

Looking at FIG. 13 for this situation, NOR gate 15 has NOR input terminal T3 connected to supply voltage VCC and NOR input terminal T4 at ground. This will cause NOR output terminal T5 to remain low and central LED lamp CL will not be energized. Since downward terminal T1 is connected to supply voltage VCC, downward LED lamp DL will be energized. Resistor R1 is of a relatively high value and therefore will not create excess current or prevent supply voltage VCC from illuminating downward LED lamp DL. Since upward terminal T2 is not connected to supply voltage VCC, upward LED lamp UL will not be energized.

Looking back at FIG. 15, downward beam DB comprises downward beam axis DA representing the direction of maximum beam intensity. Downward beam DB further comprises downward boundary top DBT and downward boundary bottom DBB, each representing directions equal to fifty percent of the maximum beam intensity. Downward boundary top DBT and downward boundary bottom DBB define the vertical beamspread of downward beam DB, which for the present embodiment, is 2A1 degrees. Downward beam axis DA bisects the vertical beamspread forming angle A1 between downward beam axis DA and downward boundary top DBT and angle A1 between downward beam axis DA and downward boundary bottom DBB. It is to be noted that at the FIG. 15 disposition of lighting device 50, downward boundary top DBT comprises a zero slope making it directed parallel to the selected direction SD. Also downward boundary bottom DBB has a negative slope (i.e. it decreases in value with distance along the downward horizontal reference plane DH and away from downward optic DO). Thus, when lighting device 50 is rotated counterclockwise to angle DA1 relative to vertical tilt plane V2, as shown in FIG. 15, power control means 8 will energize downward beam means DM. At this position, downward boundary top DBT of downward beam DB is parallel to selected direction SD. Upon further counterclockwise rotation of lighting device 50 relative to tilt plane V2, power control means 8 will continue to energize downward beam means DM. It can be seen that throughout a further counterclockwise rotation of lighting device 50 through angle 2A1 degrees, the slope of downward horizontal reference plane DH will be between the slope of downward boundary top DBT and downward boundary bottom DBB of downward beam DB. Thus, throughout a further counterclockwise rotation of lighting device 50, it will continue to project light from downward beam means DM which includes light projected parallel to downward horizontal reference plane DH and parallel to selected direction SD.

Referring now to FIGS. 5, 12, 13, and 16, it can be seen that when lighting device 50 is rotated clockwise to angle UA1 about tilt plane V2, as shown in FIG. 16, switch axis SA of tilt switch 20 is as shown in FIG. 12. For this position of tilt switch 20, common terminal TC is connected to upward terminal T2 thus applying supply voltage VCC to NOR input terminal T4. Common terminal TC is not connected to downward terminal T1. Therefore, with resistor R1, NOR input terminal T3 is at ground potential. Looking at FIG. 13 for this situation, NOR gate 15 has NOR input terminal T4, connected to supply voltage VCC with NOR input terminal T3 connected to ground. This will cause NOR output terminal T5 to remain low and central LED lamp CL will not be energized. Since upward terminal T2 is connected to power supply VCC, upward LED lamp UL will be energized. Resistor R2 is of a relatively high value and therefore will not create excess current drain or prevent supply voltage VCC from illuminating upward LED lamp UL. With downward terminal T1 at ground potential, downward LED lamp DL will not be energized.

Looking back at FIG. 16, upward beam UB comprises upward beam axis UA representing the direction of maximum beam intensity. Upward beam UB further comprises upward boundary top UBT and upward boundary bottom UBB, each representing directions equal to fifty percent of the maximum beam intensity. Upward boundary top UBT and upward boundary bottom UBB define the vertical beamspread of upward beam UB which, for the present embodiment, is 2A1 degrees. Upward beam axis UA bisects the vertical beamspread forming angle A1 between upward beam axis UA and upward boundary top UBT, and angle A1 between upward beam axis UA and upward boundary bottom UBB. It is to be noted that upward boundary top UBT comprises a positive slope (i.e. it increases in value with distance along upward horizontal reference plane UH and away from the upward optic UO). Also upward boundary bottom UBB has a zero slope making it parallel to the selected direction SD. Thus, when lighting device 50 is rotated clockwise to angle UA1 relative to tilt plane V2, power control means 8 will energize upward beam means UM. At this position, upward boundary bottom UBB of the upward beam UB is parallel to selected direction SD. Upon further clockwise rotation of lighting device 50 relative to tilt plane V2, power control means 8 will continue to energize upward beam means UM. It can be seen that throughout a further clockwise rotation of lighting device 50 through angle 2A1 degrees, the zero slope of upward horizontal reference plane UH will be between the slope of upward boundary top UBT and upward boundary bottom UBB of upward beam UB. Thus, throughout a further clockwise rotation of lighting device 50, it will continue to project light from upward beam means UM which includes light projected parallel to upward horizontal reference plane UH or equivalently along selected direction SD.

Referring back to FIG. 4, it can be seen that when all three beam means are illuminated, the vertical beamspread of the composite projected light beam is between upward boundary top UBT and downward boundary bottom DBB comprising a vertical beamspread of six times angle A1. The minimum intensity of the composite light beam will be fifty percent of the maximum intensity. Now referring to the entire function of lighting device 50, it can be seen that although only one beam means is energized at any point in time, lighting device 50 can be rotated counterclockwise up to three times angle A1 and clockwise up to three times angle A1 while continuously projecting a beam of light that includes selected horizontal direction SD.

During deployment, if the lighting device is maintained in the vertical position, the power control means energizes only the central beam means which is designed to project a light beam substantially centered about the horizontal plane. This horizontal light beam is desirable because it is visible to a distant observer on the horizontal plane. However, if the lighting device is tilted upward the power control means turns "off" the central beam means and energizes, in its place, the downward beam means. The downward beam means is designed to project a light beam downwardly diverging about the horizontal. This downward light beam would normally be useless as it would be directed into the water, however, due to the fact that the lighting device is tilted upward, the downwardly directed light beam compensates for the upward tilt of the light to project the desired horizontal light beam. If the lighting device is subsequently tilted downward, the power control means responds by turning "off" the downwardly directed beam means and energizes in its place the upwardly directed beam means. This upward beam means is designed to project a light beam upwardly diverging from the horizontal plane. This upwardly directed beam is normally useless as it would be directed into the sky and miss a horizontal observer. However, due to the fact that the lighting device is tilted downward, the upward direction of the projected light beam compensates for the downward tilt of the light to maintain a projected light beam which is horizontal and thus visible to a distant observer.

It would be possible to energize all of the beam means all of the time as a method of assuring the visibility of the ship or buoy regardless of the angle of roll or tilt of the lighting device. This concept would avoid the need for a power control means to selectively energize one of the plurality of beam means in response to its light beam being directed along the horizontal. Unfortunately energizing all of the beam means all of the time would consume a large amount of electrical energy. For some ships such as sailboats or for battery powered lighting devices, the need for extra power would be unacceptable. An unacceptable amount of electrical power would similarly be required if a single beam means with a very large angular vertical beamspread were employed. A single beam means having a very large angular beamspread in compliance with a specification minimum intensity, would also require an unacceptable amount of power. The current invention employs a plurality of beam means disposed such that if they were simultaneously energized, they would emit a plurality of light beams which would—due to their adjacent locations—combine to form a composite projected light beam of acceptable intensity throughout an acceptable vertical beamspread. In order to avoid an unacceptable drain of electrical power, some of the beam means are not energized. Specifically those beam means which at a particular angular disposition of the lighting device about the vertical reference plane do not reasonably add to the visibility of the lighting device in the selected direction, are turned "off" by the power control means.

In some embodiments of the current invention, it is possible for several beam means to be simultaneously energized. This is acceptable if at least some of the beam means are—at times—turned "off" or extinguished resulting in a reduction in the power consumed by the lighting device. The power saved by extinguishing some of the beam means can, by itself, remain as a benefit of the current invention. Alternatively, the power saved can be used to increase the intensity of the horizontal light. The intensity of the horizontal light can be increased by increasing the intensity of a single selectively energized beam means by using a more powerful light source or by employing a group of beam means all projecting light substantially within the same vertical angular beamspread and all simultaneously energized by the power control means. Increasing the intensity of the horizontal light can substantially add to the visibility of the lighting device and can be a greater benefit than a reduction in power.

It is noteworthy to realize that additional beam means can be employed to possibly save additional power. For the current lighting device, the term angular range represents the roll or vertical angular tilt that the lighting device is expected to experience. Once the angular range is established, the beam means used to form the lighting device can be designed. If a single beam means is employed to cover the entire angular range, the design is classical prior art. If on the other hand a plurality of beam means, each of which lights a portion of the vertical angular range, is cooperatively employed with a power control means designed to selectively energize one or more—but not all—of the beam means in response to the angular tilt of the lighting device, then the current invention is employed. Generally, when the current invention is employed, each of the beam means is required to project its beam of light into a portion of the vertical angular range. For example, if the angular range is ten degrees and there are two beam means, then a first beam means would be designed to project a first light beam to fill the range of vertical beamspread extending from zero to five degrees and a second beam means would be designed to project a second light beam to fill the range of vertical beamspread extending from five to ten degrees.

In a second design, the vertical angular range could be filled by a larger number of beam means. For example if there were ten beam means, each of these would be designed to fill only one vertical degree of the ten degree vertical angular range. Thus the first beam means would only be designed to project its light beam extending from zero to one degree. The second beam means would be designed to project its light beam extending from one to two degrees. The design would continue until the ten beam means, when energized would fill the entire ten degree range of vertical angular beamspread. However, for some embodiments of the current invention, at least some of the beam means which were not disposed to project light parallel to the selected direction, would at times, not be energized so that power would be saved.

A review of the energy required for both prior art and the current invention would help identify the advantages of the current invention. If a classical prior art design with one beam means is employed to fill an angular range of ten degrees, it can be considered as continuously requiring a normalized power of 1. The current invention employing two beam means, each with a five degree vertical beamspread would only require a normalized power of 0.5. This results from the fact that only one of the two beam means would be energized at any point in time. Finally, an embodiment of the current invention employing ten beam means, each with a one degree vertical beamspread, would only require a normalized power of 0.1. This results from the fact that only one of the ten beam means would need to be energized at any moment in time. Nine of the ten beam means, specifically those not disposed to direct light in the selected direction, could be extinguished at any time thereby requiring only 10 percent of the energy of prior art.

The preferred embodiment shows LED lamps as the light sources, however other electronic light sources such as electroluminescent panels or LED elements, or even incandescent lamps can be employed. Electronic light sources are especially useful when the lighting device is rocking back and forth about a vertical reference plane. In this instance, in order to avoid a lagging effect whereby the selected beam means is energized on time but—due to its slow response time—only lights after its projected light beam has moved past the horizontal direction, it is desirable that the light source illuminate rapidly upon receiving the appropriate "on" voltage from the power control means. Solid state electronic lamps respond almost instantaneously and are an excellent means of assuring that each light source commences emitting its projected light beam in the selected direction almost at the instant that the power control means energizes the lamp. For some dynamic applications, it would be difficult and expensive to provide a power control means which could correct for the slow response time characteristic of some incandescent lamps. Other dynamic applications could not employ an incandescent lamp.

The current invention can be successfully constructed by using a variety of components other then those identified herein.

The LED lamps disclosed have a lens top body or encapsulating refractor which concentrates the light emitted by the internal LED element. In the disclosed embodiment, each LED lamp projected its light into a lens which further concentrated the light in the vertical plane. LED elements can be used without the encapsulating refractor employed in the disclosed commercial T 1¾ lens top LED lamp. Also other lens shapes can be used. Additionally, electroluminescent strips can be employed as the light sources. Finally, incandescent lamps with reflectors or refractors can be acceptable for some uses. Actually, many beam means which project a beam of light can function acceptably with the power control means of the current invention.

A similar situation exists for the power control means which was disclosed as a mercury tilt switch. In fact, many devices which respond to a tilting about the vertical can be successfully substituted for the mercury tilt switch. There are other commercially available liquid tilt switches, tilt sensors or mechanical gravity switches which can be the most desirable power control means for the current invention depending upon the end purpose of the current invention.

The preferred embodiments of the current invention described a lighting device that maintained a horizontally directed light beam throughout an angular displacement of the lighting device about the vertical plane. This would be a frequent objective of the current invention. However, the invention is not limited to designs requiring a horizontally projected light beam. In fact the design can be easily modified to maintain a projected light beam at any angle relative to the vertical. FIGS. 17 thru 24 to be hereinafter presented, describe lighting device 50A which comprises a selected direction angled downward about the horizontal.

FIGS. 17 thru 24 represent lighting device 50A, an alternate embodiment of the current invention, which employs two beam means in place of the three beam means employed in lighting device 50. Additionally, each of the two beam means each create their respective projected light beams without employing the separate optical lens employed in lighting device 50. Also in lighting device 50A, upward LED lamp ULA and downward LED lamp DLA each have an integral refracting lens molded around their LED elements as found in standard commercial LED lamps such as the T 1¾ package. For some uses, this type of lamp or other lamps of similar construction, can be used without a separate optic. Lighting device 50A additionally represents an embodiment which does not require the housing employed in lighting device 50. Components of lighting device 50A which are similar in function to components described for lighting device 50, are identified with the suffix A added to the basic identifying number used for lighting deice 50. Components not previously employed have a new identification number also with the suffix A. In general, lighting device 50A functions in a fashion similar to lighting device 50 previously described. However a brief description of the operation of lighting device 50A discloses some additional features not previously disclosed.

Figure 17:
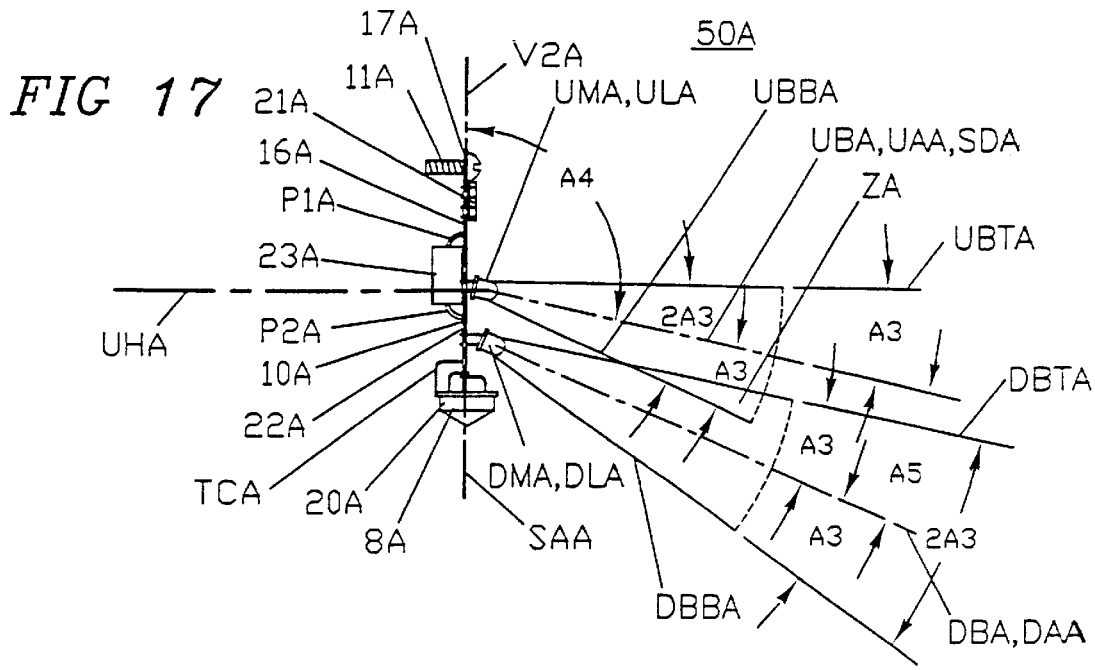
FIG. 17 is a side view of alternate lighting device 50A disposed in the vertical position with both of the beam means energized.

FIG. 17 is a side view of lighting device 50A in a vertical position.

Figure 18:
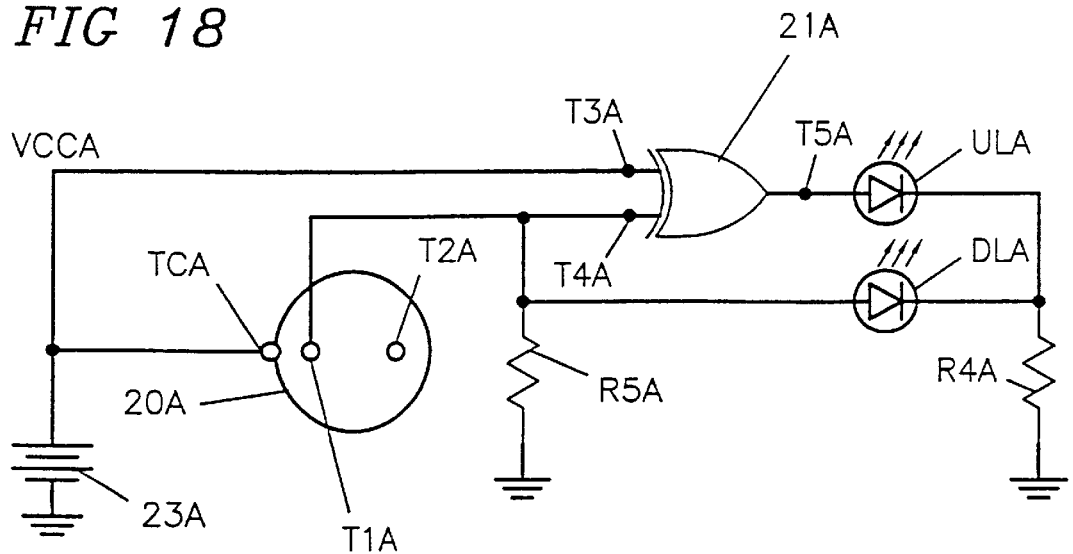
FIG. 18 is an electrical schematic of circuit assembly 10A from lighting device 50A.

FIG. 18 is an electrical schematic of the circuit employed to energize lighting device 50A. Lighting device 50A comprises circuit assembly 10A mounted on or supported by circuit board 16A. Circuit board 16A comprises upper hole 17A. Upper screw 11A passes through upper hole 17A and can be threaded into a ships bulkhead—not shown—to secure or fasten lighting device 50A to the bulkhead. As the ship rolls the angular position of lighting device 50A relative to vertical tilt plane V2A will change.

Circuit assembly 10A comprises upward LED lamp ULA, downward LED lamp DLA, battery 23A, resistor R4A and power control means 8A. Power control means 8A includes tilt switch 20A, resistor R5A and exclusive OR gate 21A. Circuit board 16A comprises circuit tracks 22A for electrically connecting the components of circuit assembly 10A in accordance with the schematic of FIG. 18. A 6 volt battery 23A is soldered to circuit tracks 22A of circuit board 16A using positive power line P1A and negative power line P2A. Circuit board 16A thus acts as a means to electrically connect circuit assembly 10A and also as a support means for its components. Circuit board 16A also supports the upward beam means UMA and downward beam means DMA in a fixed relationship such that each of their projected light beams is positioned to cooperate to achieve the objective of the current invention which is to efficiently project light parallel to or in a selected direction SDA.

Lighting device 50A is constructed to project light in a selected direction SDA throughout a range of angular displacement of lighting device 50A relative to tilt plane V2A resulting from the rolling of the ship. The selected direction SDA for the lighting device 50A embodiment of the current invention, intersects vertical tilt plane V2A forming obtuse angle A4. The selected direction SDA of lighting device 50A has a negative slope or is directed below upward horizontal reference plane UHA. In lighting device 50A, upward beam means UMA projects an upward (relative to the other beam means) light beam UBA with a vertical angular beamspread of angle 2A3. Upward beam axis UAA bisects upward beam UBA forming angle A3 between upward beam axis UAA and upward boundary top UBTA. Upward beam axis UAA similarly forms angle A3 between upward beam axis UAA and upward boundary bottom UBBA. Upward beam axis UAA is coincident with selected direction SDA. Downward beam means DMA is similar to upward beam means UMA except that it is directed at an oblique angle relative to upward beam means UMA. Downward beam means DMA projects a downward beam DBA also with a vertical angular beamspread of angle 2A3. Downward beam axis DAA bisects downward beam DBA forming angle A3 between downward beam axis DAA and downward boundary top DBTA. Downward beam axis DAA similarly forms angle A3 between downward beam axis DAA and downward boundary bottom DBBA. Upward boundary bottom UBBA of upward beam UBA overlaps downward boundary top DBTA of downward beam DBA to form overlap zone ZA. Overlap zone ZA can be a desirable feature to avoid dark zones between projected beams which can result from manufacturing tolerances relating to the vertical beamspread, the actual positions of the plurality of beam means, variations within the power control means or time lags between the energizing and illuminating of a beam means. Downward beam axis DAA forms angle A5 with upward beam axis UAA. Angle A5 is slightly less than angle 2A3 with the difference related to the magnitude of the overlap zone ZA.

Lighting device 50A is constructed with a consistency and symmetry of beamwidths. This facilitates the construction and description. The current invention can also be constructed with each beam means having unbalanced vertical beamspreads about its beam axis and with different beamspreads for each of the plurality of projected light beams. Also the selected direction SDA is shown as coincident with the upward beam axis UBA. This is also a parameter that can be changed within the scope of the current invention. Contingent upon factors including the intensity required to be maintained along the selected direction and the vertical intensity profile of each projected beam pattern, the location of the selected direction within a particular projected beam for a particular angular disposition of the lighting device about tilt plane V2A can be varied. As long as the selected direction SDA falls between the top boundary and the bottom boundary of the projected light beam, some light will be projected along the selected direction. The intensity of that projected light must be adequate to comply with the particular specification if the overall design is to be acceptable. For the current embodiment we are considering the intensity of the projected light along the selected direction as adequate if the selected direction is within the boundaries of any of the light beams which lighting device 50A can emit. If both beam means are illuminated, the projected light beams combine to form a composite light beam diverging above and below the selected direction SDA. Of course the current embodiment of the current invention employs a power control means 8A which selectively energizes only one of the beam means. The power control means 8A selectively energizes the beam means which will—when energized—project light along or parallel to the selected direction.

Figure 19:
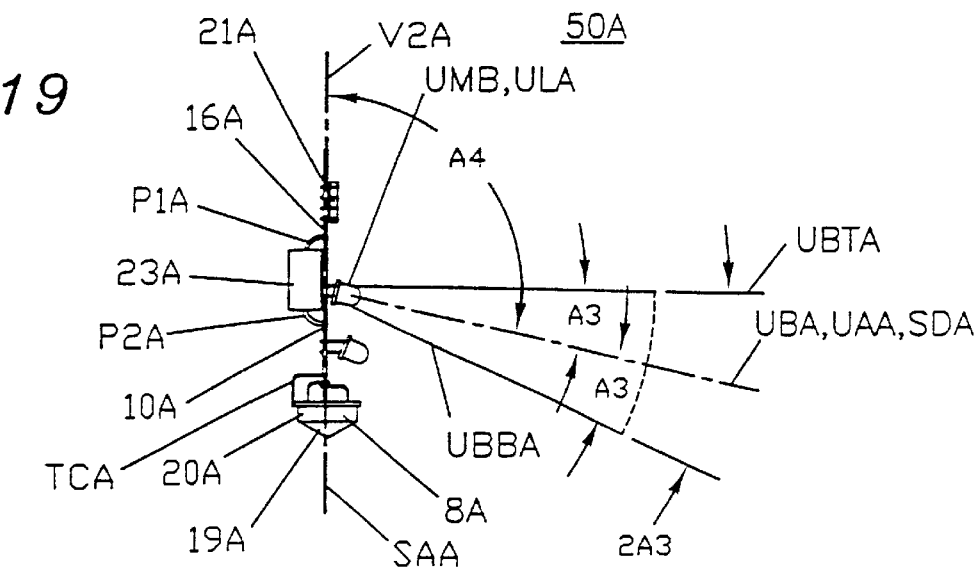
FIG. 19 is a side view of lighting device 50A disposed in the vertical position with only the upward beam means energized.

FIG. 19 is a side view of lighting device 50A similar to FIG. 17 except in FIG. 19 only upward beam means UMA is energized.

Figure 20:
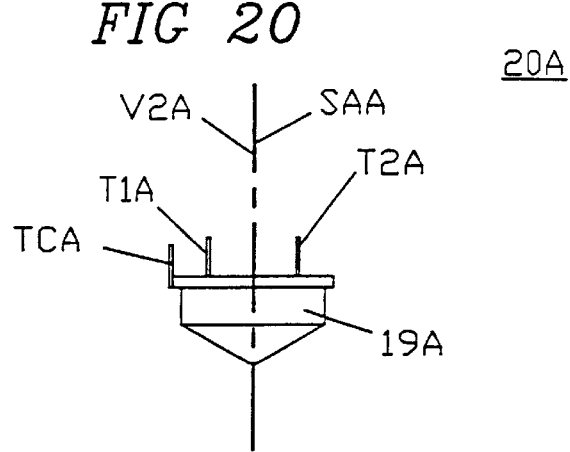
FIG. 20 is a side view of tilt switch 20A from FIG. 19 of lighting device 50A.

FIG. 20 is a side view of tilt switch 20A from FIG. 19. Referring to FIGS. 17, 18, 19 and 20, when lighting device 50A is in the vertical position as shown in FIG. 17 the metal body 19A of tilt switch 20A is disposed such that switch axis SAA of tilt switch 20A is coincident with tilt plane V2A. In this position of tilt switch 20A, power supply voltage VCCA is not applied to downward terminal T1A or upward terminal T2A. Actually, for lighting device 50A, upward terminal T2A of tilt switch 20A is not employed. Also exclusive OR input terminal T3A of exclusive OR gate 21A, is continuously connected to supply voltage VCCA. Resistor R5A is of a relatively high value such that it brings exclusive OR input terminal T4A to ground when supply voltage VCCA is not applied to exclusive OR input terminal T4A but does not draw enough current to prevent supply voltage VCCA from energizing LED lamp DLA when it is applied to downward terminal T1A. Exclusive OR output terminal T5A will be high when only one of the exclusive OR gate 21A input terminals T3A and T4A is high. Therefore for the FIG. 19 disposition of lighting device 50A output terminal T5A of exclusive OR gate 21A, is high and upward LED lamp ULA is energized. Since downward terminal T1A is not connected to supply voltage VCCA, downward LED lamp DLA is not energized. Resistor R4A is in series with upward LED lamp ULA and downward LED lamp DLA to assure that they draw the appropriate current for their type of lamp.

Figure 21:
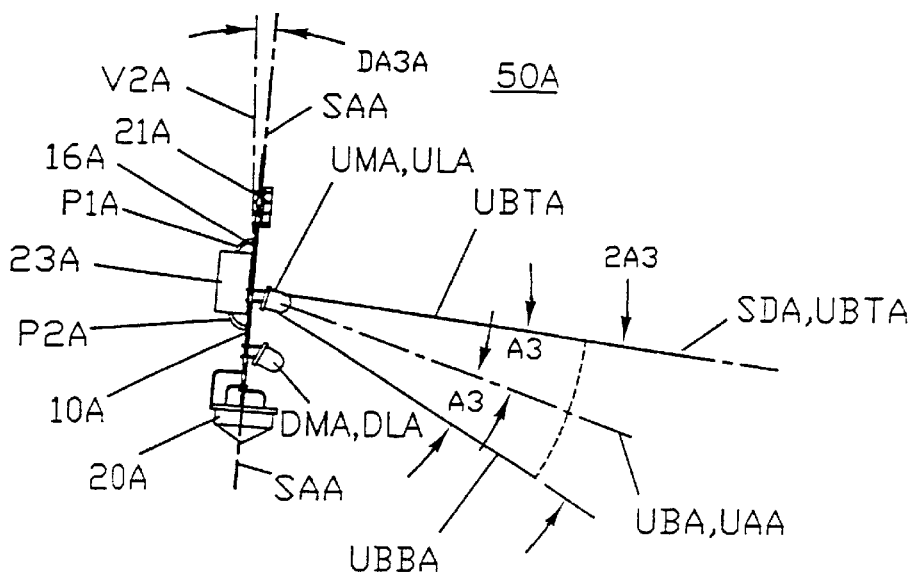
FIG. 21 is a side view of lighting device 50A disposed rotated clockwise about the vertical with only the upward beam means energized.
Figure 22:
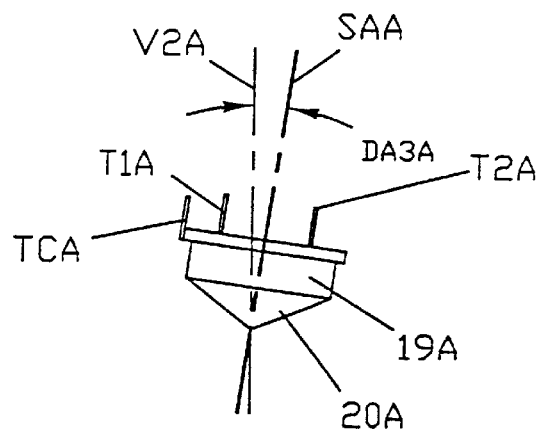
FIG. 22 is a side view of tilt switch 20A from FIG. 21 of lighting device 50A.

Referring to FIGS. 21 and 22 where FIG. 21 is a side view of lighting device 50A rotated clockwise about tilt plane V2A to clockwise angle DA3A and FIG. 22 is a side view of tilt switch 20A from FIG. 21. For this embodiment clockwise angle DA3A is equal to angle A3.

Referring to FIGS. 17, 18, 21 and 22, with tilt switch 20A rotated clockwise to angle DA3A, supply voltage VCCA is connected to upward terminal T2A and not connected to downward terminal T1A. Since upward terminal T2A is not connected to other current components, the circuit assembly 10A responds as described for FIG. 19 and only upward beam means UMA is energized. It should be noted that due to the rotation of lighting device 50A in FIG. 21, the selected direction SDA substantially aligns with upper boundary top UBTA of upper beam means UMA.

Figure 23:
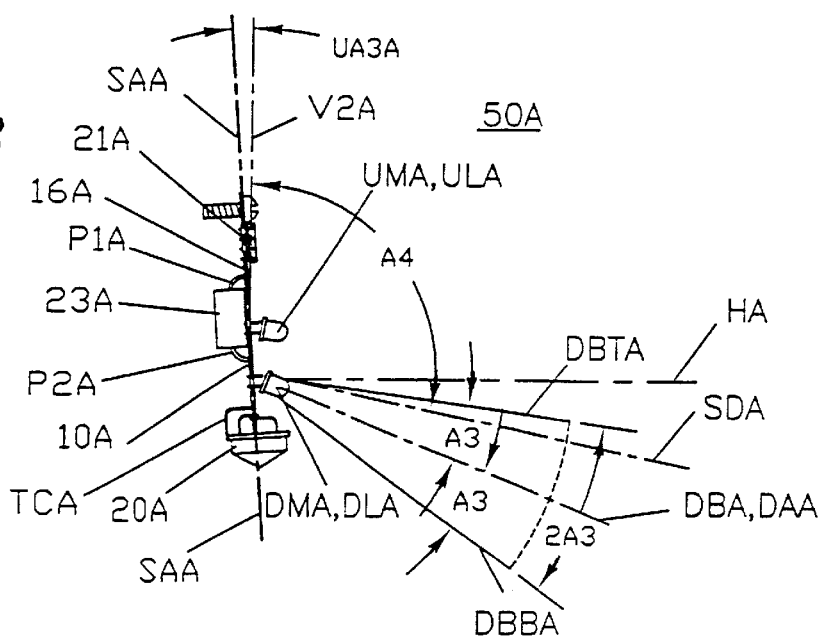
FIG. 23 is a side view of lighting device 50A disposed rotated counterclockwise about the vertical with only the downward beam means energized.
Figure 24:
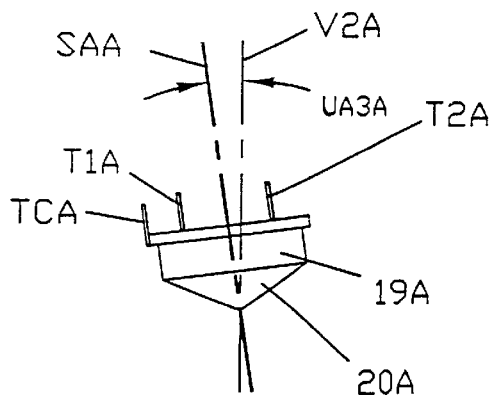
FIG. 24 is a side view of tilt switch 20A from FIG. 21 of lighting device 50A.

FIG. 23 is a side view of lighting device 50A rotated counterclockwise about tilt plane V2A to counterclockwise angle UA3A and FIG. 24 is a side view of tilt switch 20A from FIG. 23. For this embodiment counterclockwise angle UA3A is equal to angle A3.

Referring to FIGS. 17, 18, 23 and 24, with tilt switch 20A rotated counterclockwise to angle UA3A, supply voltage VCCA is connected to downward terminal T1A and not connected to upward terminal T2A. Since upward terminal T1A is connected to exclusive OR input terminal T4A, exclusive OR gate 21A with both input terminals high does not energize exclusive OR output terminal T5A or upward LED lamp ULA. However, downward terminal T1A is connected to downward LED lamp DLA, thereby energizing and illuminating downward LED lamp DLA. Resistor R4A limits the current so that downward LED lamp DLA does not draw too much current. Downward beam means DMA thus emits downward beam DBA with selected direction SDA within downward beam DBA and adjacent to downward boundary top DBTA. A further counterclockwise rotation of lighting device 50A of approximately 2A3 degrees will not alter the current flow in circuit assembly 10A and downward beam means DMA will remain energized. Also throughout most, but not necessarily all, of this additional counterclockwise rotation selected direction SDA will fall between downward boundary top DBTA and downward boundary bottom DBBA of downward beam DBA. Thus lighting device 50A will project a light beam which includes light directed along the selected direction SDA throughout a vertical range of movement of slightly less than four times angle A3.

Figure 25:
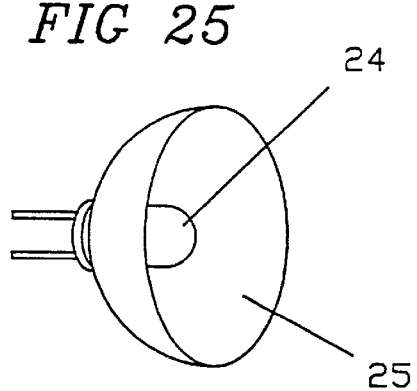
FIG. 25 is a perspective view of an incandescent light source and a reflector.

FIG. 25 is a perspective view of a type of commercially available incandescent lamp 24 and reflector 25 which can substitute for the upward means UMA and the downward means DMA of FIG. 23.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept.

It is to be understood, therefore, that within the scope of the appended claims, the invention may be practiced otherwise than as specifically set forth herein.

What is claimed is:

1. An electrical lighting device comprising:
    a plurality of light beam means connectable to a source of electrical power having a voltage, each of said light beam means comprising a light source for projecting a respective light beam upon application of the voltage to said respective light source;
    a circuit assembly comprising said plurality of light beam means and a power control means;
    said circuit assembly being at least partially disposed on a support such that said light beams are diverging from one another; and
    said power control means for selectively applying the voltage to at least one of said light beam means in response to an angular divergence between said light beam and said horizontal plane.

2. The electrical lighting device of claim 1, wherein two beam means are provided.

3. The electrical lighting device of claim 1, wherein three beam means are provided.

4. The electrical lighting device according to claim 1, wherein said power control means further comprises a tilt switch.

5. The electrical lighting device according to claim 1, wherein said power control means further comprises a tilt switch, said tilt switch having a first switch responsive to a first angular disposition of said tilt switch and a second switch responsive to a second angular disposition of said tilt switch.

6. The electrical lighting device according to claim 1, wherein said power control means further comprises a gravity switch.

7. The electrical lighting device according to claim 1, wherein said light beams, when formed, combine to form a composite light beam.

8. The electrical lighting device according to claim 7, wherein each light beam has a vertical beam spread, the composite light beam having a vertical beam spread larger than the vertical beam spread of any of each of said light beams.

9. The electrical lighting device according to claim 1, wherein each said light source has a respective light emitting diode.

10. The electrical lighting device according to claim 1, wherein each said light source has a respective light emitting diode lamp.

11. The electrical lighting device according to claim 1, wherein each said light source has a respective incandescent lamp.

12. The electrical lighting device according to claim 1, wherein each said beam means has a lens disposed to concentrate the light beam emitted by said light source.

13. The electrical lighting device according to claim 1, wherein each said beam means has a reflector disposed to concentrate the light beam emitted by said light source.

14. An electrical lighting device comprising:
    a plurality of light beam means connectable to a source of electrical power having a voltage, each of said light beam means comprising a light emitting diode light source for projecting a respective light beam upon application of the voltage to said respective light source;
    a circuit assembly comprising said source of electrical power, said plurality of light beam means and a power control means;
    said circuit assembly at least partially disposed on a support such that said light beams are diverging from one another; and
    said power control means for selectively applying the voltage to at least one of said light beam means in response to an angular divergence between said light beam and said horizontal plane.

15. An electrical lighting device comprising:
    a plurality of component lighting devices connectable to a source of electrical power having a voltage, each of said component lighting devices for projecting a respective light beam upon application of the voltage to said respective component lighting devices;
    a circuit assembly comprising said plurality of component lighting devices and a power control;
    said circuit assembly at least partially disposed on a support such that said light beams are diverging from one another; and
    said power control having a respective tilt switch connected between each said component lighting device and said source of electrical power, said power control responsive to the vertical angular disposition of said support relative to a vertical plane, said power control switching each of said tilt switches at a preselected vertical angular disposition of said support such that power is provided to at least one of the component lighting devices depending upon the vertical angular disposition of said support.

16. The electrical lighting device of claim 15, wherein two component lighting devices are provided.

17. The electrical lighting device of claim 15, wherein three component lighting devices are provided.

18. A method of providing a beam of light in a horizontal plane irrespective of the vertical angular disposition of a support upon which an electrical lighting device generating the beam of light is mounted, comprising the steps of:
    providing the electrical lighting device connectable to a source of electrical power, and a plurality of light beam means, each of said light beam means having a light source for projecting a respective light beam upon application of the electrical power to said respective light source,
    providing a circuit assembly having said plurality of light beam means and a power control means, the power control means having a tilt switch responsive to the vertical angular disposition of said support, said circuit assembly being at least partially disposed on the support such that said light beams are diverging from one another,
    applying electrical power to a selected light beam means to project the light beam in the horizontal plane,
    removing electrical power from said selected light beam means as the vertical angular disposition of the support changes and applying electrical power sequentially to selected light beam means as a function of the vertical angular disposition of the support wherein the horizontal beam of light is provided.

* * * * *